United States Patent [19]

Mori et al.

[11] Patent Number: 4,768,031

[45] Date of Patent: Aug. 30, 1988

[54] RADIO PAGING RECEIVER HAVING A MESSAGE PROTECTION CAPABILITY

[75] Inventors: Toshihiro Mori; Shinjiro Umetsu, both of Tokyo, Japan

[73] Assignee: NEC Corporation, Tokyo, Japan

[21] Appl. No.: 939,977

[22] Filed: Dec. 10, 1986

[30] Foreign Application Priority Data

Dec. 10, 1985 [JP] Japan ................................ 60-278360

[51] Int. Cl.⁴ .......................... H04Q 7/00; G08B 5/22

[52] U.S. Cl. ............................ 340/825.44; 340/311.1; 455/38; 455/343

[58] Field of Search ....................... 340/875.44, 825.48, 340/825.36, 311.1; 455/343, 31, 38; 365/228, 229

[56] References Cited

U.S. PATENT DOCUMENTS

| | | | |
|---|---|---|---|
| 4,227,257 | 10/1980 | Sato | 455/343 |
| 4,369,443 | 1/1983 | Giallanza et al. | 340/825.44 |
| 4,438,433 | 3/1984 | Smoot et al. | 340/825.44 |
| 4,521,776 | 6/1985 | Smoot et al. | 340/825.44 |

*Primary Examiner*—John W. Caldwell, Sr.
*Assistant Examiner*—Edwin C. Holloway, III
*Attorney, Agent, or Firm*—Sughrue, Mion, Zinn, Macpeak & Seas

[57] ABSTRACT

In a radio paging receiver which is capable of responding to a message signal specific to the receiver and which comprises a display unit (90) and a message processing section (60) for making the display unit display the message signal, the message processing section monitors the message signal to produce a drive signal after reception of the message signal until the message signal is delivered to the display unit. Responsive to the drive signal, a combination of transistors (3 and 2) keeps power supply of a power source 18 to the message processing section as long as the drive signal is produced. Such power supply is carried out regardless of a state of a power supply switch (20). A decoder (40) makes a speaker (80) generate an alarm in response to the drive signal after the power supply switch is put into an off state. The alarm lasts until the switch is put into an on state. The message processing section may comprise a RAM for storing the message signal as a stored signal and another RAM for storing specific information indicating whether or not the stored signal is delivered to the display unit. Alternatively, such specific information may be stored in a memory included in the decoder.

6 Claims, 10 Drawing Sheets

FIG 3
PRIOR ART
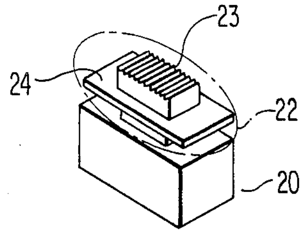
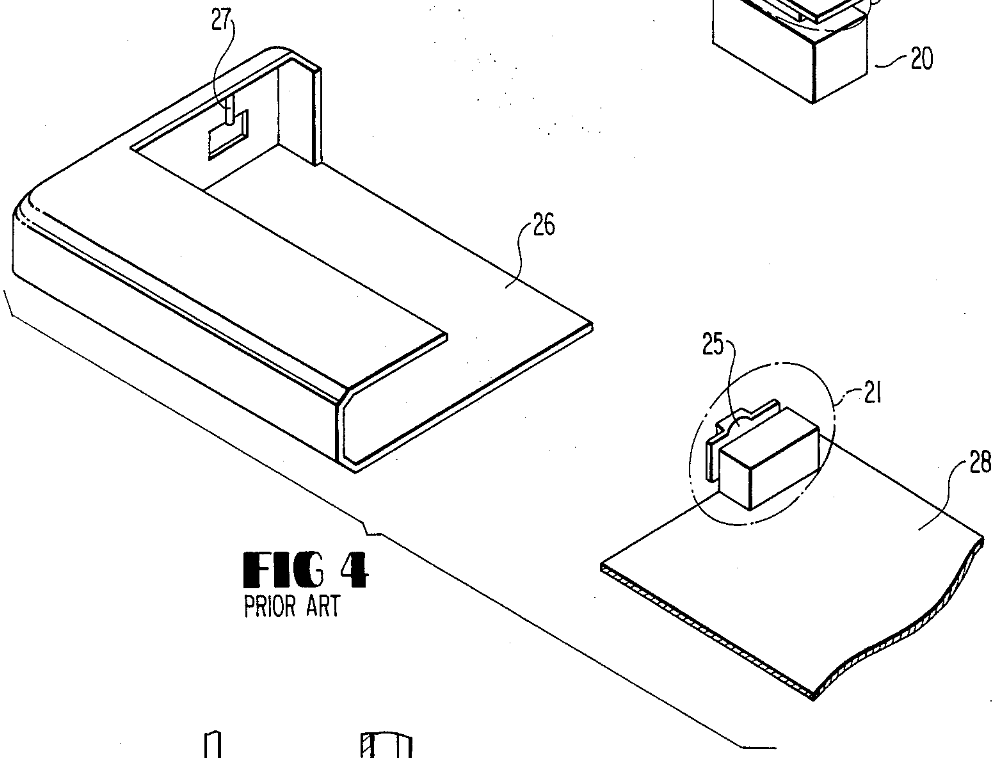
FIG 4
PRIOR ART
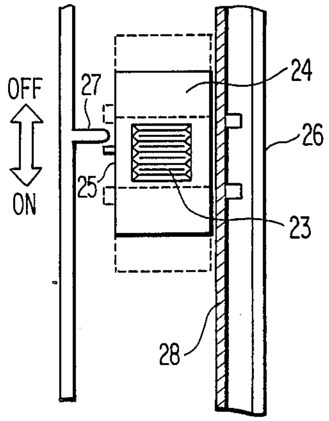
FIG 5
PRIOR ART

RADIO PAGING RECEIVER HAVING A MESSAGE PROTECTION CAPABILITY

BACKGROUND OF THE INVENTION

The present invention relates to a radio paging receiver that can receive and store a message signal specific to the receiver.

In general, such a message signal carries message information. Heretofore, among such type of radio paging receivers, those having a capability of protecting messages so that stored messages may not be erased, have been known. With regard to the methods for protecting memory contents, the following two methods are known:

(1) A method of employing a power supply for memory backup that is provided separately from a main power supply or source of the radio receiver (a backup method); and (2) A method of mechanically protecting erroneous operation of a switch of the main power supply (a mechanical countermeasure method).

As will later be described with reference to five figures of the accompanying drawings, the above-mentioned methods in the prior art respectively have the following shortcomings. In the first place, the backup method is disadvantageous in the aspect of cost and small-sizing of the radio receiver. This is because a battery to be solely used for backup purpose is necessitated in addition to the main power supply. In addition, in practical use, although the radio paging receiver can protect data, a possessor of the receiver cannot know whether or not messages unconfirmed by the possessor are present within a memory in the radio paging receiver.

The mechanical countermeasure method is defective in that perfect protection of messages is impossible when the switch has been slid while it is depressed.

SUMMARY OF THE INVENTION

It is therefore a general object of the present invention to provide a radio paging receiver in which messages can be protected even if a power supply switch of the radio receiver should be turned off by mistake in the case where unconfirmed messages are present within a memory.

It is a specific object of the present invention is to provide a radio paging receiver of the type described, which can inform presence of unconfirmed messages to a possessor of the radio paging receiver when a power supply switch is turned off in the case where unconfirmed messages are present.

A radio paging receiver to which this invention is applicable is capable of responding to a message signal specific to the receiver when the receiver is supplied with electric power from a power source. The receiver includes storing means for storing the message signal as a stored signal when the storing means is supplied with the electric power, display means responsive to the stored signal for displaying a display when the display means is supplied with the electric power, and switching means having an on state and an off state for switching the electric power to energize and deenergize the power source in the on state and the off state, respectively. According to this invention, the radio paging receiver comprises monitoring means coupled to the storing means and to the switching means for monitoring whether or not the stored signal is delivered to the display means to produce a drive signal after the stored signal is stored in the storing means until the stored signal is delivered to the display means, and holding means coupled to the switching means, the storing means, and the monitoring means and responsive to the drive signal for holding the electric power to supply the electric power to the storing means and to the monitoring means as long as the drive signal is produced from the monitoring means.

According to an aspect of this invention, the radio paging receiver further comprises alarm generating means operatively coupled to the switching means and to the monitoring means for generating an alarm in response to the drive signal after the switching means is put into the off state until the switching means is put into the on state.

In other words, the radio paging receiver has a message protection capability and comprises means for monitoring whether or not received and stored messages have been confirmed even once by a possessor of the receiver, and means responsive to an unconfirmation or drive signal issued from the monitoring means for effecting power supply to at least a message storing memory independently of a state of a power supply switch of the radio receiver.

The radio paging receiver further comprises means for generating an alarm in response to the unconfirmation or drive signal only when a switch having an on state and an off state is put into the off state. The alarm is generated until the switch is put into the on state.

The above-mentioned and other features and objects of the present invention will become more apparent by reference to the following description of preferred embodiments of the invention taken in conjunction with the accompanying drawings.

BRIEF DESCRIPTION OF THE DRAWINGS

In the accompanying drawings:

FIGS. 3 to 5 are general perspective views showing an example of a mechanical countermeasure for protecting memory data against erroneous operation of a switch in the prior art;

DESCRIPTION OF THE PREFERRED EMBODIMENTS

Figure 1:
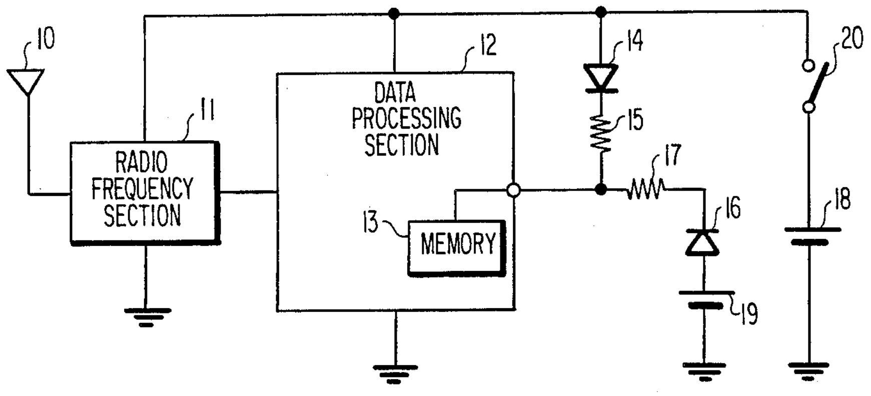
FIG 1 PRIOR ART
FIGS. 1 and 2, respectively, are block diagrams showing examples of the methods for protecting memory data in the prior art.

Referring to FIG. 1, a conventional method for protecting memory contents will be described at first for a better understanding of this invention and is substantially equivalent to the backup method described in the Background section of the instant specification. In the backup method, when a switch 20 for switching electric power from a main power supply 18 of a radio paging receiver is closed, electric power is supplied to a memory section 13 included in a data processing section 12 from the main power supply 18 through a diode 14 and a resistor 15. When the switch 20 is opened, electric power is supplied from a backup power supply 19 through a diode 16 and a resistor 17, and hence data in the memory section 13 can be protected without being influenced by opening or closing of the switch 20, by momentary cut-off of the main power switch 18, and by replacement of the main power supply 18. In FIG. 1, reference numeral 10 designates an antenna and numeral 11 designates a radio frequency section.

The backup method is defective in the aspect of cost and small-sizing of the radio receiver. This is because a battery 19 to be solely used for backup purpose is necessitated in addition to a main power supply 18. Although the radio paging receiver can protect data, a possessor of the receiver cannot know whether or not unconfirmed messages are present within a memory in the receiver as described above.

Figure 2:
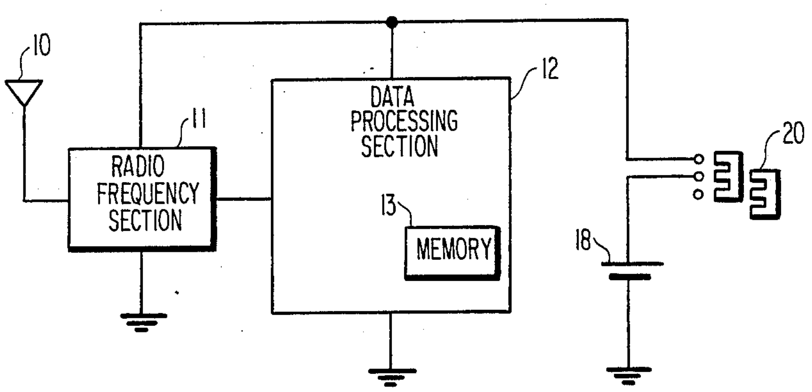
FIG 2 PRIOR ART

Referring to FIGS. 2 to 5, another conventional method for protecting memory contents will be described and is substantially eguivalent to the mechanical countermeasure method described in the Background section of the instant specification. In the mechanical countermeasure method, as shown in FIG. 2, electric power is supplied from a power supply 18 to a radio frequency section 11 and a data processing section 12 through a switch 20 which switches the electric power from a power supply 18 for a radio paging receiver. External appearance of the switch 20 is shown in FIG. 3. The switch is mounted on a print substrate 28 like the other circuits as shown in FIG. 4. The substrate is accommodated within a casing 26 as shown in FIG. 4. This state as viewed from the direction of a switch knob 23 of the switch 30 is shown in FIG. 5. In FIGS. 2 to 5, reference numeral 21 designates a slide switch having a depressing function. Reference numeral 22 designates a slide section. Reference numeral 24 designates eaves. Reference numeral 25 designates a protrusion provided on the eaves 24, and reference numeral 27 designates a protrusion provided on the casing 26.

As will be seen with reference to FIG. 5, even if the possessor intends to simply slide the knob 23, it could not be slid because the respective protrusions 25 and 27 provided on the eaves 24 and the casing 26 would collide with each other. If it is really necessary to slide the knob 23, it can be achieved by moving the slide section 22 while the possessor is depressing the slide section 22.

In the mechanical countermeasure method, in the case where the switch has been slid while it is depressed, perfect protection of messages is impossible as described above.

Figure 6:
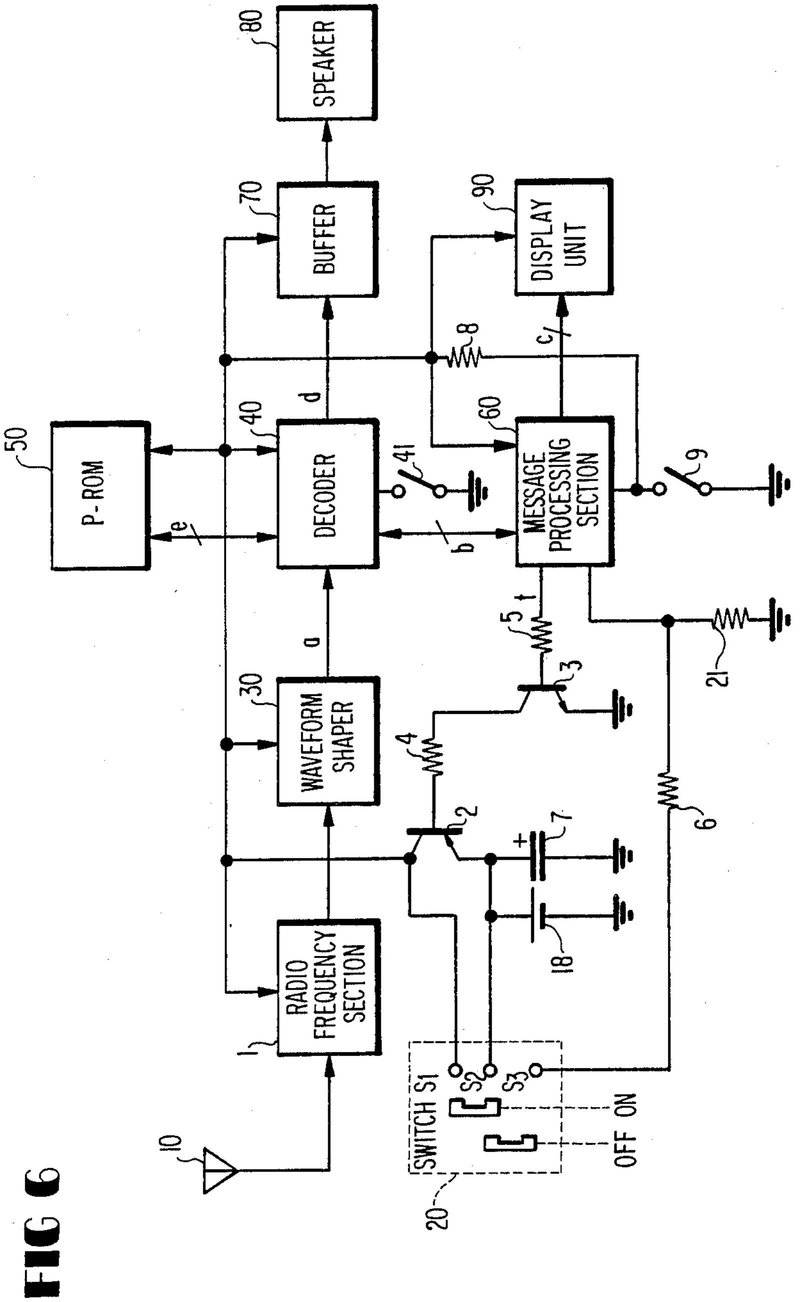
FIG. 6 is a block diagram of a radio paging receiver according to a first preferred embodiment of the present invention.
Figure 7:
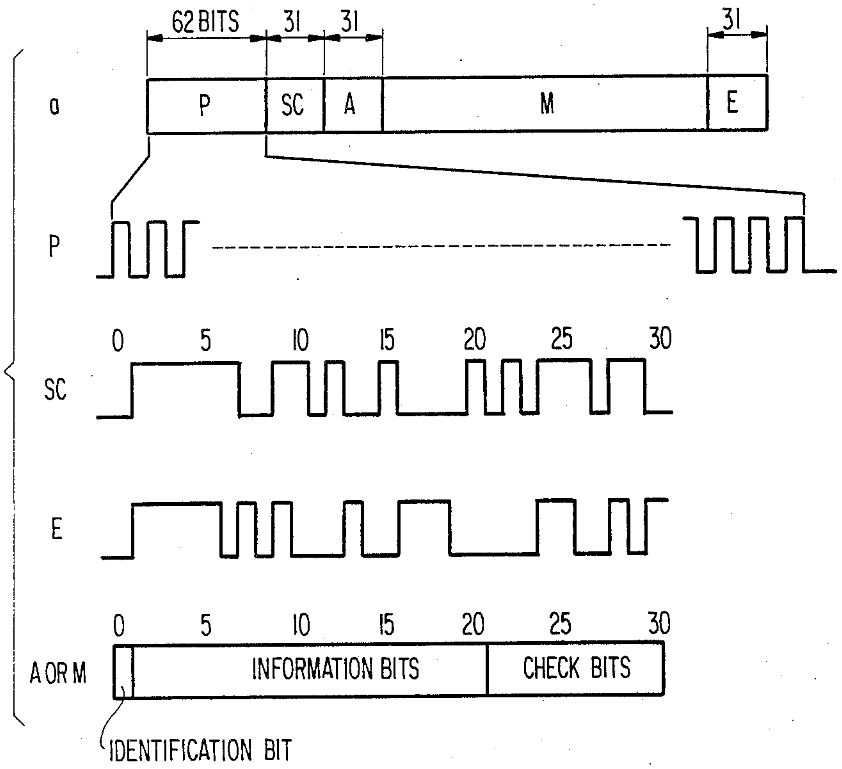
FIG. 7 is a diagram showing a construction of signals received and demodulated in the radio paging receiver in FIG. 1.

Referring to FIG. 6, a radio paging receiver according to a first embodiment of this invention operates when the receiver is supplied with electric power from a power source 18, such as a battery. When a power supply switch 20 is turned ON, the electric power is supplied from the battery power supply or source 18 to every section of the radio paging receiver. A capacitor 7 is connected in parallel to the battery power supply 18. A desired radio frequency signal is received and demodulated in a radio frequency section 1 via an antenna 10. In a waveform shaping section 30, a digital signal a as shown at the uppermost level in FIG. 7 is provided. When the digital signal a is delivered to a decoder 40, the decoder 40 establishes bit synchronization by means of a preamble pattern P consisting of repetition of logic "1" and "0," and then it turns to detection of a frame synchronizing signal SC that is issued subsequently.

Figure 8:
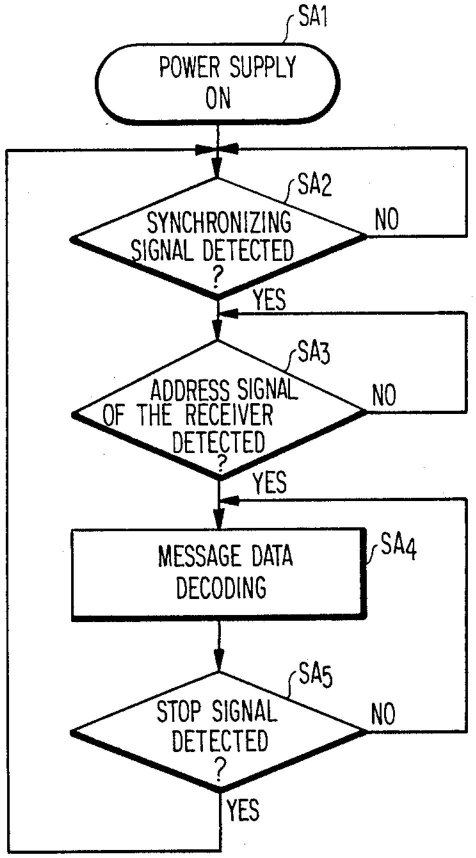
FIG. 8 is a flow chart showing a mode of operation of a decoder 40 in FIG. 1.
Figure 10:
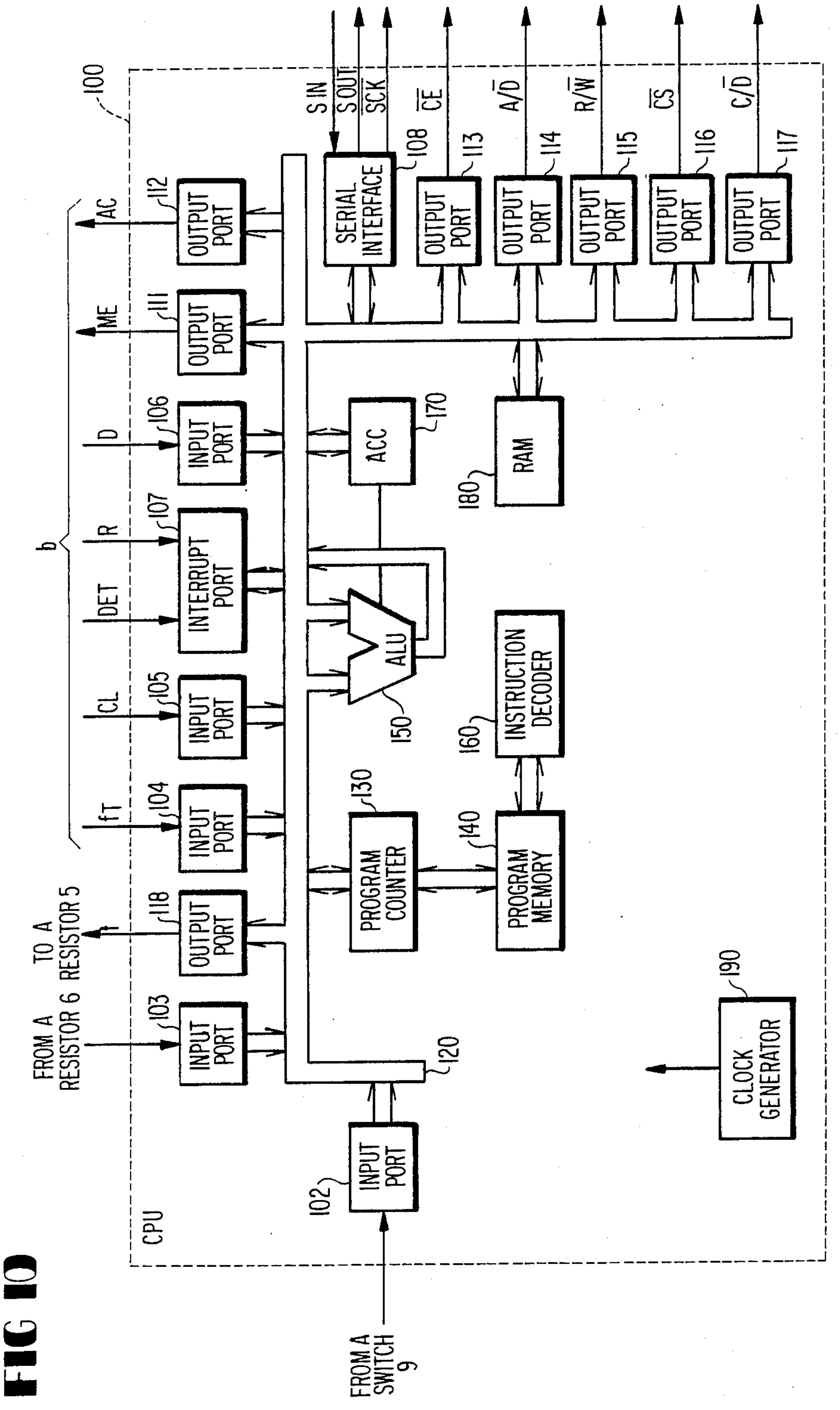
FIG. 10 is a block diagram showing a construction of a single-chip CPU 100 in FIG. 9.

At this time, if detection of the frame synchronizing signal SC is confirmed, the decoder 40 starts to read in paging or calling number data from a P-ROM (programmable read-only memory) 50 where its own paging number is preliminarily written. The decoder 40 compares the paging number data with an address signal A in the digital signal a bit by bit. If coincidence of these data is confirmed, the decoder 40 activates a message processing section 60 by means of a signal b (FIG. 10). Subsequently, the decoder 40 carries out reception and decoding of a subsequent message signal M, and waits for a stop signal E. This operation flow is shown in FIG. 8.

The respective signals SC, A, M and E in FIG. 7 are formed of BCH (Bose-Chaudhuri-Hocquenghem) codes of (31, 21) known in the art. The frame synchronizing signal SC and the stop signal E have fixed patterns, respectively. Each of the address signal A and the message signal M has an MSB (most significant bit) in the information area of the BCH (31, 21) codes as an identification bit. If the identification bit is a logic "0," the signal is processed as an address signal, while if it is a logic "1," it is processed as a message signal.

Here, the message data are formed by standard codes of ISO (International Organization for Standardization) 7 bits, and the message signal M is constructed by each BCH (31, 21) code having the information area of 20 bits. Thus, if the stop signal E which indicates an end of the message signal M is detected, calling indication means such as a speaker 80 is made to sound via a buffer 70, and thereby it notifies a possessor or holder of the radio paging receiver that calling has been effected for him.

With the radio paging receiver in which a lot of message data can be received and stored through the abovementioned procedure, a possessor of the radio paging receiver can successively read out and confirm the message data stored within the memory (that is, an RAM 300 in FIG. 9) in the radio paging receiver by means of a read-out switch 9 according to necessity. Confirmation of the message data is carried out by making a display unit 90 display the read-out message data. The display unit 90 is, for example, an LCD (liquid crystal display).

Now, the message processing section 60 and the display unit 90 are explained in more detail in the following.

Figure 9:
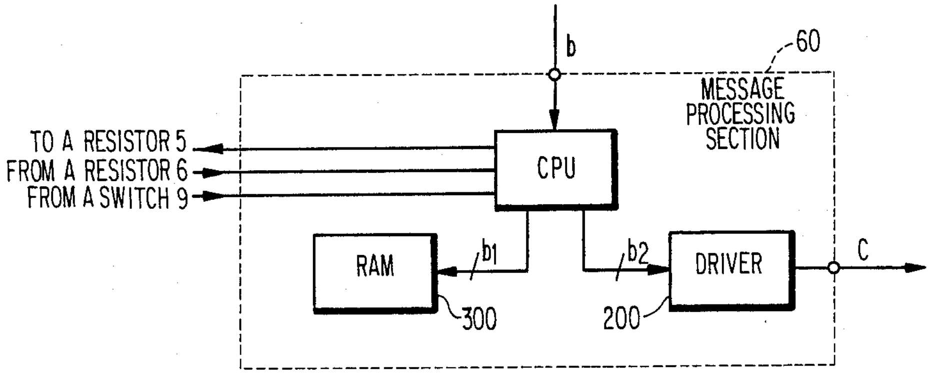
FIG. 9 is a block diagram showing a construction of a message data processing section 60 in FIG. 1.

First, the message processing section 60 is constructed as shown in FIG. 9, in which reference numeral 100 designates a single chip CPU, numeral 200 designates a liquid crystal display (LCD) driver, and numeral 300 designates a RAM. Furthermore, among these components, a more detailed construction of the single chip CPU is shown in FIG. 10, that of the LCD driver 200 is shown in FIG. 11 and that of the RAM 300 is shown in FIG. 12.

In the single chip CPU 100 shown in FIG. 10, reference numerals 102 to 106 designate input ports, numeral 107 designates an interrupt port, numeral 108 designates a serial interface, numerals 111 to 118 designate output ports, and numeral 120 designates a data bus. Reference numeral 130 designates a program counter for designating an address, and numeral 140 designates a program memory in which a sequence of instructions to be executed are stored and the contents at the address designated by the program counter 130 are read out. Reference numeral 150 designates an ALU (Arithmetic and Logic Unit) for performing various operations such as arithmetic operations and logic operations, and numeral 160 designates an instruction decoder for decoding information read out of the program memory 140 to supply control signals corresponding to the decoded instructions to the respective sections. Reference numeral 170 designates an ACC (Accumulator) to be used for transmission and reception of data between a RAM 180 and the respective ports 104 to 119. Reference numeral 180 designates a RAM to be used for memory of various data, subroutines, program count in interruption, and saving of a program status. Reference numeral 190 designates a system clock generator for determining an executive instruction cycle time.

Figure 11:
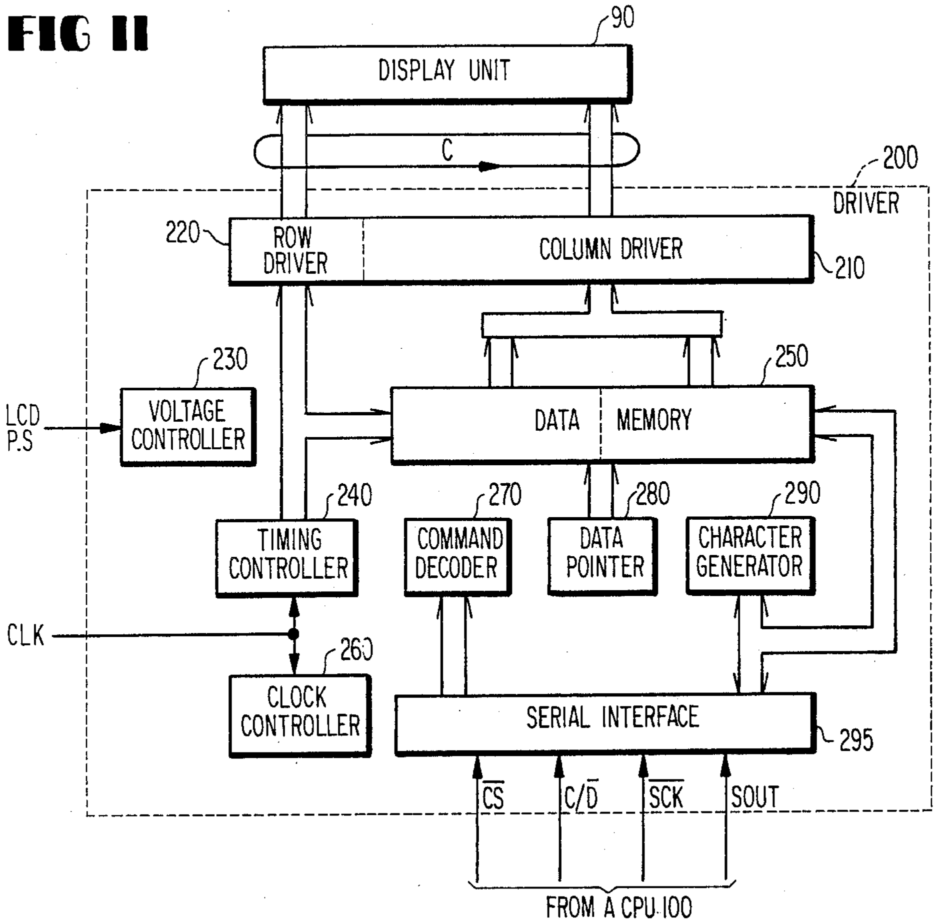
FIG. 11 is a block diagram showing a construction of an LCD driver 200 in FIG. 9.

In addition, in the LCD driver 200 shown in FIG. 11, reference numeral 210 designates a column driver for performing column control for the LCD, and numeral 220 designates a row driver for performing row control for the LCD. Reference numeral 230 designates an LCD voltage controller for controlling a supply voltage to the LCD 90, and numeral 240 designates an LCD timing controller for controlling drive timing of the LCD 90. Reference numeral 250 designates a data memory for storing display data fed from an output of a character generator 290 or from a serial interface 295. Reference numeral 260 designates a system clock controller. A command decoder 270 takes in a command through the serial interface 295 and decodes the command to control the respective sections in response to the contents of the command. A data pointer 280 is for designating an address for either writing data from the serial interface 295 to the data memory 250 or reading data from the data memory 250 into the serial interface 295. Reference numeral 290 designates a character generator for generating a pattern based on a 7×5 dot matrix in response to the input data, and numeral 295 designates a serial interface for serially transferring data to and from the single chip CPU 100.

Figure 12:
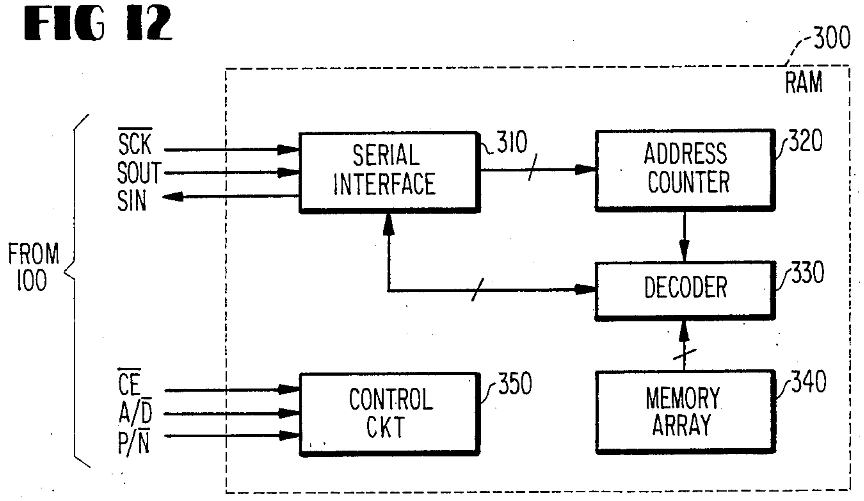
FIG. 12 is a block diagram showing a 25 construction of a RAM 300 in FIG. 9.

In a RAM 300 shown in FIG. 12, reference numeral 310 designates a serial interface for transferring data to and from the single chip CPU 100, and numeral 320 designates an address counter. An X-Y decoder 330 analyzes data in the address counter 320 and designates an address of a memory array 340 to write or read data in or from the memory. Reference numeral 340 designates a memory array, and numeral 350 designates a control circuit.

When the signal shown at a in FIG. 7 is supplied to the decoder 40 via the antenna 10, the radio frequency section 1, and the waveform shaping section 30 (FIG. 6), bit synchronization is established at the portion P in FIG. 7 in the decoder 40 and the operation shifts to detection of the subsequent frame synchronizing signal SC. If a desired pattern is transferred from the waveform shaping section 30 to a signal detector circuit in the decoder 40, the pattern is compared with the data fed from the P-ROM 50 bit by bit, and, at the same time, detection of the stop signal is carried out.

Description will be made as regards receiving operation of a message signal with reference to FIG. 10.

When a signal DET is supplied to an interrupt port 107 as a result of address coincidence, the single chip CPU 100 is excited via the interrupt port 107 and is supplied with a clock CL corresponding to a transmission speed via the input port 105. As a result, in the single chip CPU 100, the message signal D is read in through the input port 106 in accordance with the above-mentioned clock CL. Predetermined contents of the program memory 140 are translated by the instruction decoder 160, and processing of the message signal is carried out in response to the respective commands. More particularly, the above-referred read-in signal (that is, the message signal) is written in a message storing area of the RAM 180 via the data bus 120 and the ACC 170. Each time when 31 bits have been received, operation is effected in the ALU 150 to decode the received signal. It is to be noted that the RAM 180 has also a flag storing area for storing flags for the message signals stored in the message storing area. When the message signal M is stored in the message storing area, the flag for the stored message signal is set into a logic "1".

Description will be made as regards storing operation of the message signal into a RAM 300 with reference to FIGS. 10 and 12.

In order to store and maintain 20 bits of the information bits among the decoded respective BCH (31, 21) codes, in the external RAM 300 as message information, the single chip CPU 100 excites the external RAM 300 into an operation mode by setting a chip enable signal line $\overline{CE}$ into a logic "0" level. The single chip CPU 100 provides the RAM 300 with address information indicating what address of the RAM 300 the message information is to be written in, via the serial interface 108 and a signal line SOUT. At this time, the single chip CPU 100 sends a system clock to the RAM 300 through a signal line $\overline{SCK}$, and simultaneously sets a signal line $A/\overline{D}$ into a logic "1" level in order to represent that the information is an address. And at this moment, in FIG. 12, the RAM 300 determines the signal received through the signal line SOUT as an address signal in accordance with the respective control signals ($\overline{CE}$, $A/\overline{D}$, $R/\overline{W}$), and an address of the memory array 340 where the information is to be written is designated via the address counter 320 and the X-Y decoder 330.

Subsequently, in the single chip CPU 100, message data to be written are sent out through a signal line SOUT of the serial interface 108. At the same time, the signal $A/\overline{D}$ is set into a logic "0" in order to represent that the sent data are message data, and the signal $R/\overline{W}$ is set into a logic "0" in order to represent writing.

As a result, in the RAM 300 shown in FIG. 12, in response to the respective control signals, the data received through the signal line SOUT are written at the previously designated address in the memory array 340 via the X-Y decoder 330, as message data.

Description will be made as regards generating operation of an alarm with reference to FIGS. 6 and 10.

While the message signals are being decoded successively through the above-mentioned procedure, when a predetermined pattern representing an end of a message signal is detected among the decoded message data or the message signal cannot be received consecutively for 2 words, the single chip CPU 100 notifies the decoder 40 that the message has ended, from the output port 111 through a signal line ME. At this moment, the decoder 40 stops supply of the clock CL to the single chip CPU 100.

In addition, when the decoder 40 has detected the stop signal, the decoder 40 stops supply of the clock CL to the single chip CPU 100. Then, the single chip CPU 100 determines that the message signal has ended and stops decode processing of the message signal. At the same time, a sound generator circuit of the decoder 40 is controlled through a signal line AC and the output port 112. Thus, an alarm horn or speaker 80 sounds, and thereby it is notified that calling was done to the possessor.

Generally, a radio receiver of the type described has a capability (auto-reset capability) of automatically stopping the alarm sound after a predetermined period (for example, about 8 seconds). In this preferred embodiment also, a frequency-divided output $f_T$of an oscillator circuit in the decoder 40 is applied to the single chip CPU 100, and this is used as a timing signal to control the alarm sound for about 8 seconds.

Here it is to be noted that, during the alarm sound, if a possessor of the radio paging receiver makes access to a switch 41, a signal R is supplied from the decoder 50 to the interrupt port 107 of the single chip CPU 100, hence supply of a sound control signal AC from the output port 112 to the decoder 40 is stopped without waiting for the lapse of 8 seconds, and so, the radio paging receiver stops the alarm sound.

Simultaneously with the end of reception of the message signal, the decoded message data are displayed through the following processes.

The single chip CPU 100 supplies first address information of the corresponding message data to the external RAM 300 through the signal line SOUT, also sets a chip enable signal line $\overline{CE}$ into a logic "0" level and sets a chip select signal line $\overline{CS}$ (this being a signal line for selecting the LCD driver 200) and a signal line A/$\overline{D}$ into a logic "1" level. Next, the single chip CPU 100 sets the signal line A/$\overline{D}$ into a logic "0" level and also sets the signal line R/$\overline{W}$ into a logic "1" level. Thereby, starting from the above-mentioned first address, t e corresponding data are successively read out bit by bit from the memory array 340 via the X-Y decoder, and the data are supplied to the single chip CPU 100 via the serial interface 310 and a signal line SIN. When the data have been read out from the external RAM 300 in the above-described manner and have been supplied to the single chip CPU 100, the single chip CPU 100 shown in FIG. 10, at first sets the signal line $\overline{CE}$ and a signal line C/$\overline{D}$ (C representing a command) into a logic "1" level, and also in order to select the LCD driver 200, it supplies a character transformation command and storage address information to the LCD driver 200 shown in FIG. 11 through the signal line SOUT by setting the chip select signal line $\overline{CS}$ into a logic "0" level. Subsequently, the single chip CPU 100 supplies the message data read out from the external RAM 300 to the LCD driver 200 through the signal line SOUT by setting the signal line C/$\overline{D}$ into a logic "0" level. As described above, the RAM 180 stores a flag of a logic "1" for the read-out message data. When the message data is read out of the RAM 300, the CPU 100 carries out operation to change the flag into a logic "0."

As a result, in the LCD driver 200 shown in FIG. 11, the command decoder 270 decodes the information subjected to serial-parallel conversion in the serial interface circuit 295 to produce an internal control signal when the signal line C/$\overline{D}$ is set into a logic "1" level. Here, if the command is either a write command or a character transformation command, the data pointer 280 is accessed to set a write address therein.

On the other hand, if the signal line C/$\overline{D}$ is given the logic "0" level, the data are delivered via the serial interface 295 and are converted by the character generator 290 into a pattern for a 7×5 dot matrix to be sent as the signal C through the data memory 250 and the column driver 210 and the row driver 220 to the LCD 90 under control of the LCD timing controller 240. Thus, the pattern is displayed on the LCD 90.

At this time, the display on the LCD 90 is scrolled page by page.

Now, description will now be made, with reference to FIGS. 6, 9, and 10, as regards the case where a plurality of messages are stored in the RAM 300, and among the stored messages there is an unconfirmed message which is not yet confirmed by the possessor. In this case, in response to memory contents, namely, the flags, in a predetermined area, namely, the flag storing area, of the RAM 180 which monitors unconfirmed messages and stores the flags as the monitoring information, the single chip CPU 100 controls in such manner that a PNP transistor 2 may be brought into a conducting state via the output port 118, a resistor 5, an NPN transistor 3 and a resistor 4, in contrast to the fact that electric power was supplied from the battery 18 to the radio paging receiver so far only through terminals S1 and S2. Accordingly, electric power is supplied from the battery 18 directly to the radio paging receiver through the transistor 2 regardless of the position of the switch 20, and therefore, even if the possessor of the radio paging receiver should turn OFF the switch 20 by mistake. Thus, despite the fact that the unconfirmed messages are present within the memory, the contents of the memory can be protected.

Figure 13:
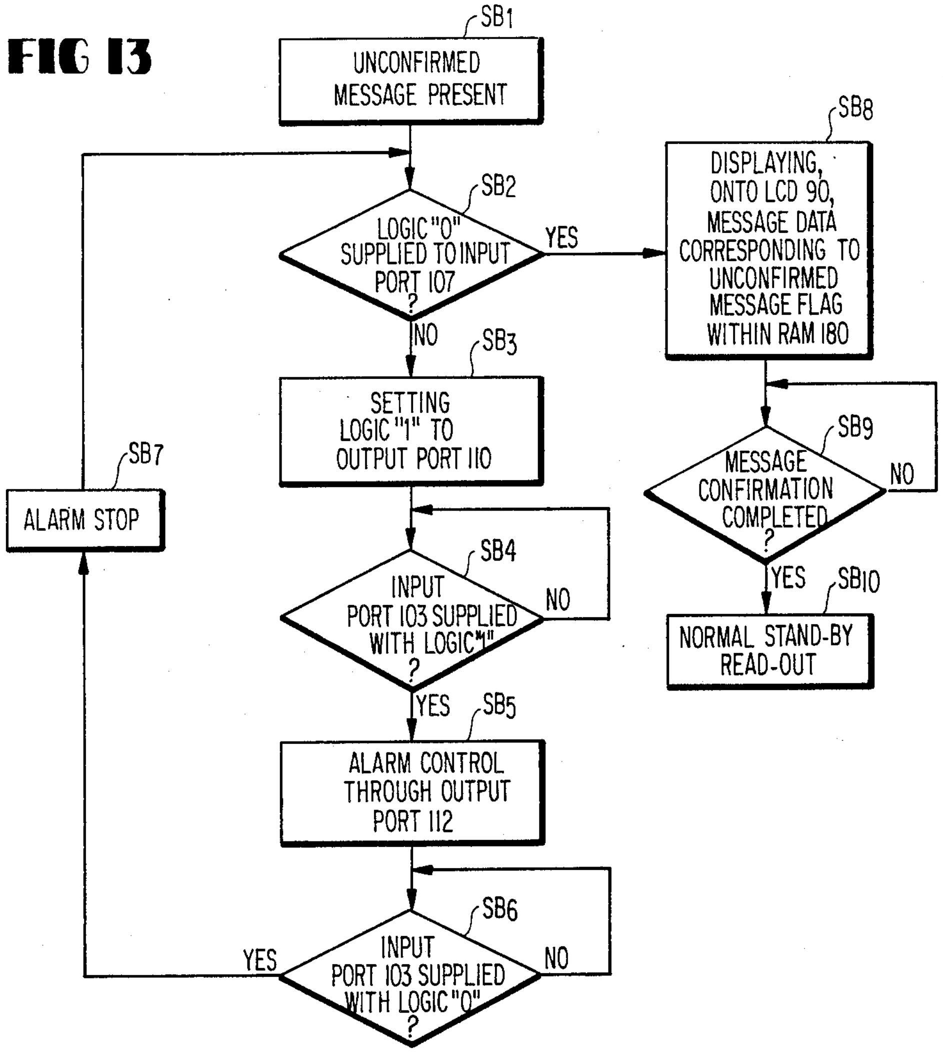
FIG. 13 is a flow chart showing a flow of operation in a radio paging receiver in the case where unconfirmed messages are present within a memory in the radio receiver.

In addition, when the switch 20 is turned OFF, the voltage of the battery 18 is divided by resistors 6 and 21, and the divided voltage is applied to the input port 103. Thereby, the single chip CPU 100 confirms the logic "1" on the port 103 and issues a predetermined alarm through the output port 112. As a result, the possessor of the radio paging receiver can recognize that an unconfirmed message is present within the radio receiver, and can confirm the message by reading. To stop the alarm, it is necessary to turn wN the switch 20. For the confirmation operation, at first the read switch 9 is operated and thereby unconfirmed messages within a memory area are successively read out via the interrupt port 107. The operation flow in such case where unconfirmed messages are present, is shown in FIG. 13.

Description will now be made as regards a feature of the radio paging receiver with reference to FIGS. 6 to 10.

As described above, the radio paging receiver is capable of responding to a message signal M specific to the receiver when the receiver is supplied with electric power from the power source 18. The receiver comprises the RAM 300 operable as a storing portion which is for storing the message signal M as a stored signal when the storing portion is supplied with the electric power. Responsive to the stored signal, a display unit of the LCD 90 displays a display when the LCD 90 is supplied with the electric power. The power supply switch 20 has an on state and an off state and switches the electric power to energize and deenergize the power source 18 in the on state and the off state, respectively.

The CPU 100 having the RAM 180 is operable as a monitoring portion which is coupled to the storing portion and to the switch 20 and which monitors whether or not the stored signal is delivered to the display unit to produce a drive signal t (FIGS. 6 and 10) after the stored signal is stored in the storing portion until the stored signal is delivered to the display unit. In this event, the drive signal t is produced, with reference to the flag storing area of the RAM 180, when the flag storing area stores at least one flag of the logic "1." When all flags stored in the RAM 180 are changed into the logic "0," the CPU 100 stops production of the drive signal t.

A combination of the transistors 3 and 2 is operable as a holding portion coupled to the switch 20, the storing portion, and to the monitoring portion and responsive to the drive signal for holding the electric power to supply the electric power to the storing portion and to the monitoring portion as long as the drive signal is produced from the monitoring portion.

The speaker 80 is coupled to the monitoring portion through the decoder 40 and the buffer 70, and to the switch 20 through the resistance 6, the CPU 100, the decoder 40, and the buffer 70. The speaker 80 is operable as an alarm generating portion for generating an alarm in response to the drive signal after the switch 20 is put into the off state until the switch 20 is put into the on state.

Figure 15:
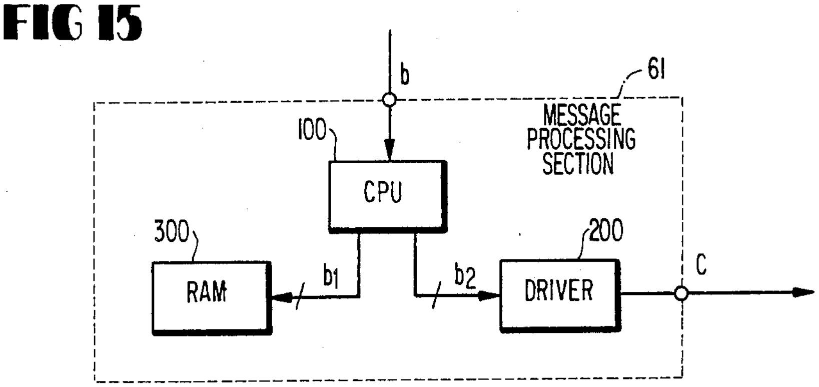
FIG. 15 is a block diagram showing a construction of a message data processing section 61 in FIG. 14.
Figure 14:
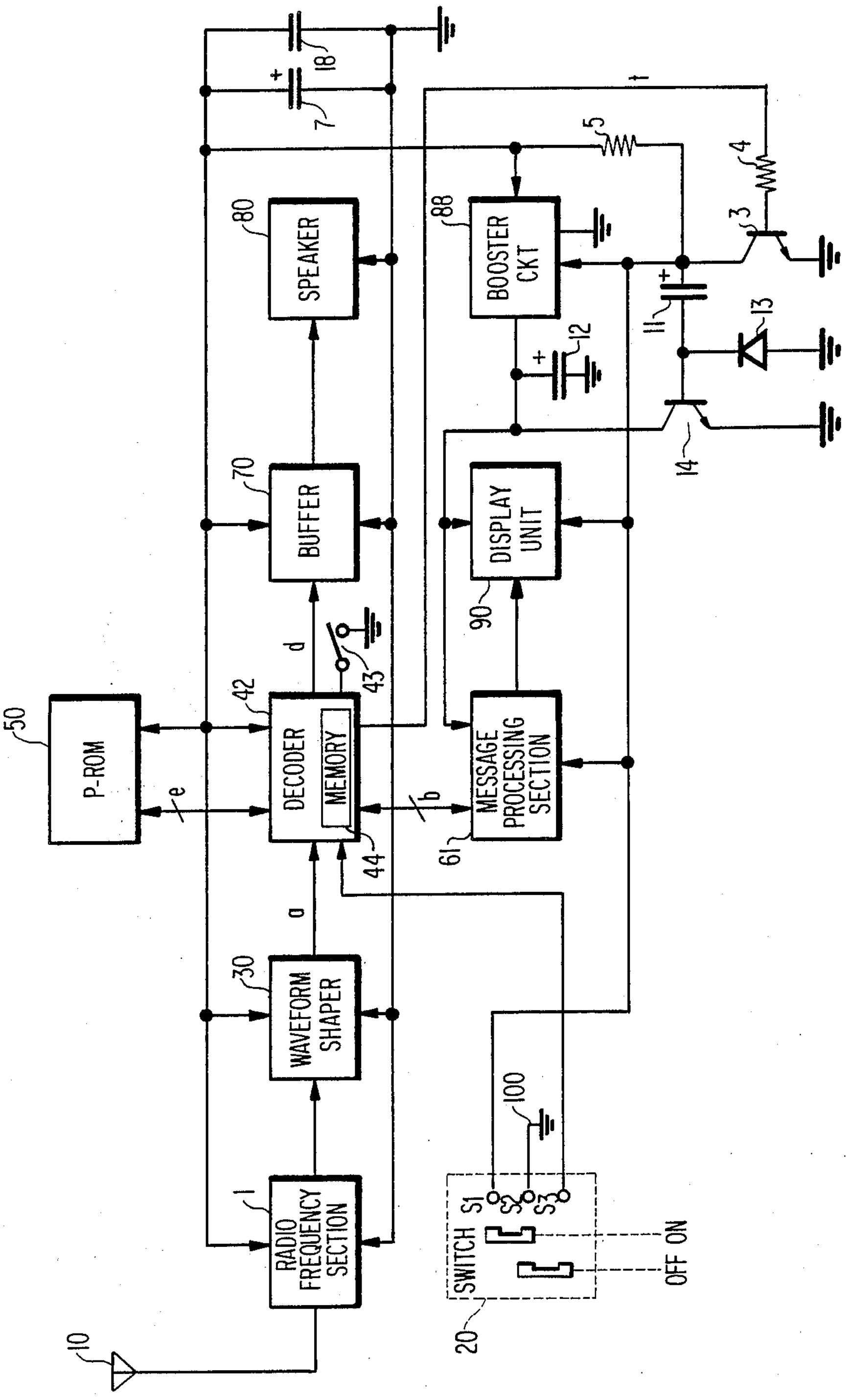
FIG. 14 is a block diagram of a radio paging receiver according to a second preferred embodiment of the present invention.
Figure 16:
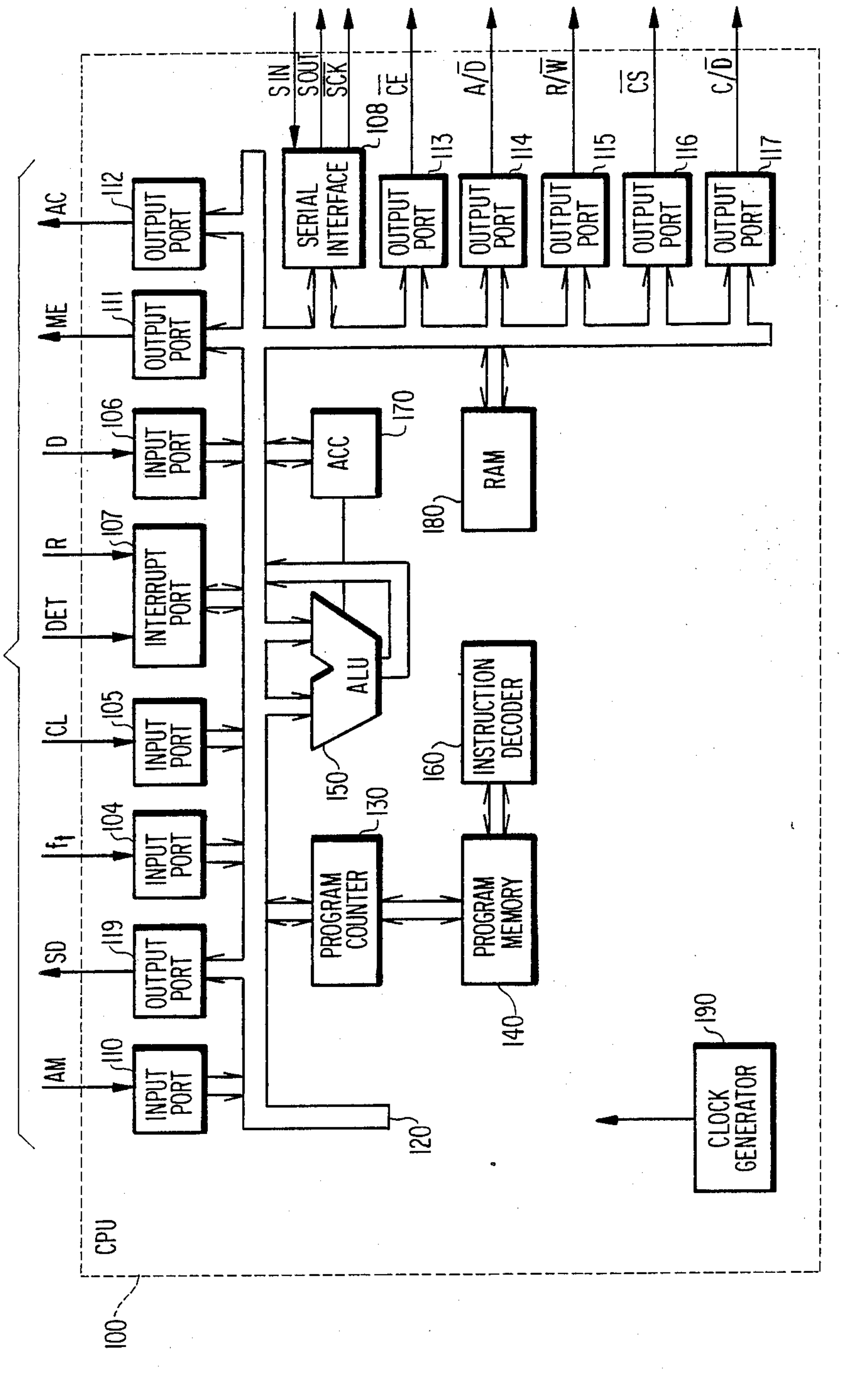
FIG. 16 is a block diagram of a construction of a single-chip CPU 100 in FIG. 15.

Referring to FIGS. 14 to 16, a radio paging receiver according to the second embodiment of this invention comprises similar parts designated by like reference numerals. The receiver has a circuit construction in the case where a message protection capability is provided by suppressing a consumed current of the receiver small in a system that a drive voltage for the message processing section and the subsequent sections is higher than a drive voltage for the preceding sections. The higher voltage is realized by means of a booster circuit 88.

The operation of the receiver is as follows: That is, a reception signal formed through an antenna 10, a radio frequency section 1 and a waveform shaping circuit 30 is delivered to a decoder 42. The decoder 42 comprises a decoder memory 44. Then, in the decoder 42, bit synchronization is established by a preamble signal P, and detection for a synchronizing signal SC is effected. When the detection of the synchronizing signal has been confirmed, the operation transfers to detection of the received paging number (address number) A, and it is sequentially compared with the-contents of the P-ROM 50 where individual paging numbers are written. As a result, if coincidence is confirmed therebetween, a message processing section 61 is excited via a signal b, and the operation transfers to decoding of message data M. The received message data are once written in an RAM 300 of the message processing section 61. If the reception of the message data M is finished, message monitoring data, such as a flag representing whether or not the message has been read out even once and the order of reception, is written jointly with the message data in a memory area of the decoder memory 44. Whenever the data within the decoder memory 44 and the contents within the message processing section 61 are different, the contents of the decoder memory 44 are renewed. In FIG. 16, it is sent to the decoder memory 44 via the output port 119.

In addition, whenever reception of the message data M is confirmed, a speaker 80 is driven via a buffer 70 as is the case with the receiver illustrated in FIG. 6. Now, if a reset switch 43 is depressed during driving of the speaker, it stops the alarm. When it is depressed during cease of the alarm, it acts as a message data read switch.

The decoder 42 produces a drive signal t (FIG. 14) having a logic "H" level only when an unconfirmed message is present among the received messages. Responsive to the drive signal t, a transistor 3 is turned on. Therefore, a high voltage system comprising the message processing section 61, the display 90 and the booster circuit 88 is forcibly brought into an operating state when the switch 20 comes to an off state. The decoder 42 is coupled to the switch 20 and produces an alarm signal AM (FIG. 16) only when the switch 20 comes to an off state in the case where the unconfirmed message is present among the received messages. In this event, the decoder 42 judges, with reference to the contents of the decoder memory 44, whether or not the unconfirmed message is present. In order to issue an alarm in response to the alarm signal "AM" in FIG. 16, the single chip CPU 100 controls the decoder 42 via an alarm control terminal "AC" so as to drive the speaker 80 via the buffer 70 and thereby notifies the possessor of the radio paging receiver that the unconfirmed message is present.

Here, a circuit formed of a capacitor 11, a diode 13 and a transistor 14 is a circuit for quickly discharging the charge on the capacitor 12 connected to the output voltage terminals of the booster circuit 88 to make the initial reset of the message processing section 61 correctly operable.

As mentioned above, the decoder 42 having a decoder memory 44 is operable as a monitoring portion which is coupled to the storing portion 300 and to the switch 20 and which monitors whether or not a stored signal (that is, a message signal) stored in the storing portion is delivered to the display unit 90 to produce a drive signal t after the stored signal is stored in the storing portion until the stored signal is delivered to the display unit.

A combination of the transistor 3, the booster circuit 88, and a ground lead 100 (FIG. 14) connected to a terminal $S_2$ of the switch 20 is operable as a holding portion coupled to the switch 20, the storing portion 300, and to the monitoring portion and responsive to the drive signal for holding the electric power to supply the electric power to the storing portion and to the monitoring portion as long as the drive signal is produced from the monitoring portion.

The speaker 80 is coupled to the monitoring portion through the buffer 70 and to the switch 20 through the buffer 70 and the decoder 42, and generates an alarm in response to the drive signal after the switch 20 is put into the off state until the switch 20 is put into the on state.

As explained above, according to the present invention, there are advantages that unconfirmed messages would not be lost by erroneous operation of a power supply switch of a radio paging receiver and also that fact can be notified to the possessor of a radio paging receiver.

While this invention has thus far been described in conjunction with a few embodiments thereof, it will readily be possible for those skilled in the art to put this invention into practice in various other manners. For example, the power supply switch 20 may be a slide switch 21 (FIG. 4) having a depressing function. Alternatively, the power supply switch 20 may be formed of a single electronic switching circuit element which can be selectively put into an on state and an off state.

What is claimed is:

1. A radio paging receiver capable of responding to a message signal specific to said receiver when said receiver is supplied with electric power from a power source, said receiver including storing means for storing said message signal as a stored signal when said storing means is supplied with said electric power, and switching means having an on state and an off state for switching said electric power to energize and deenergize said power source in said on state and said off state, respectively said radio pager comprising:

monitoring means coupled to said storing means and to said switching means for monitoring read-out of said stored signal to produce a drive signal when said stored signal has not been read out;

manually operable read-out means, coupled to said monitoring means, for reading out said stored signal when said read-out means is in a first position: and holding means coupled to said switching means, said storing means, said monitoring means, and said manually operable read-out means, and responsive to said drive signal for holding said stored signal in the presence of said drive signal without said read-out of the stored signal as long as said manually operable read-out means is not in said first position even in said off state of said switching means.

2. A radio paging receiver as claimed in claim 1, further comprising alarm generating means operatively coupled to said monitoring means for generating an alarm in response to said drive signal.

3. A radio paging receiver as claimed in claim 1, further comprising alarm generating means operatively coupled to said switching means and to said monitoring means for generating an alarm in response to said drive signal after said switching means is put into said off state until said switching means is put into said on state.

4. A radio paging receiver as claimed in claim 1, said receiver further comprising display means responsive to said stored signal for displaying said stored signal when said display means is supplied with said electric power, wherein said monitoring means is coupled to said storing means and to said switching means and monitors whether or not said stored signal is delivered to said display means to produce a drive signal after said stored signal is stored in said storing means until said stored signal is delivered to said display means.

5. A radio paging receiver as claimed in claim 4, further comprising alarm generating means operatively coupled to said monitoring means for generating an alarm in response to said drive signal.

6. A radio paging receiver as claimed in claim 4, further comprising alarm generating means operatively coupled to said switching means and to said monitoring means for generating an alarm in response to said drive signal after said switching means is put into said off state until said switching means is put into said on state.

* * * * *

UNITED STATES PATENT AND TRADEMARK OFFICE
CERTIFICATE OF CORRECTION

PATENT NO. : 4,768,031

DATED : August 30, 1988

INVENTOR(S) : Toshihiro Mori et al

It is certified that error appears in the above-identified patent and that said Letters Patent is hereby corrected as shown below:

| | |
|---|---|
| COLUMN 2, LINE 63 | After "a" (second instance) delete "25"; |
| COLUMN 3, LINE 40 | Delete "eguivalent" insert --equivalent--; |
| COLUMN 7, LINE 53 | Delete "t e" insert --the--; |
| COLUMN 8, LINE 58 | Delete "wN" insert --ON--. |

Signed and Sealed this

Fourteenth Day of March, 1989

*Attest:*

DONALD J. QUIGG

*Attesting Officer* *Commissioner of Patents and Trademarks*